Feb. 16, 1971  R. I. VAN NICE  3,564,471
ELECTRICAL WINDINGS
Filed Dec. 10, 1968  4 Sheets-Sheet 4

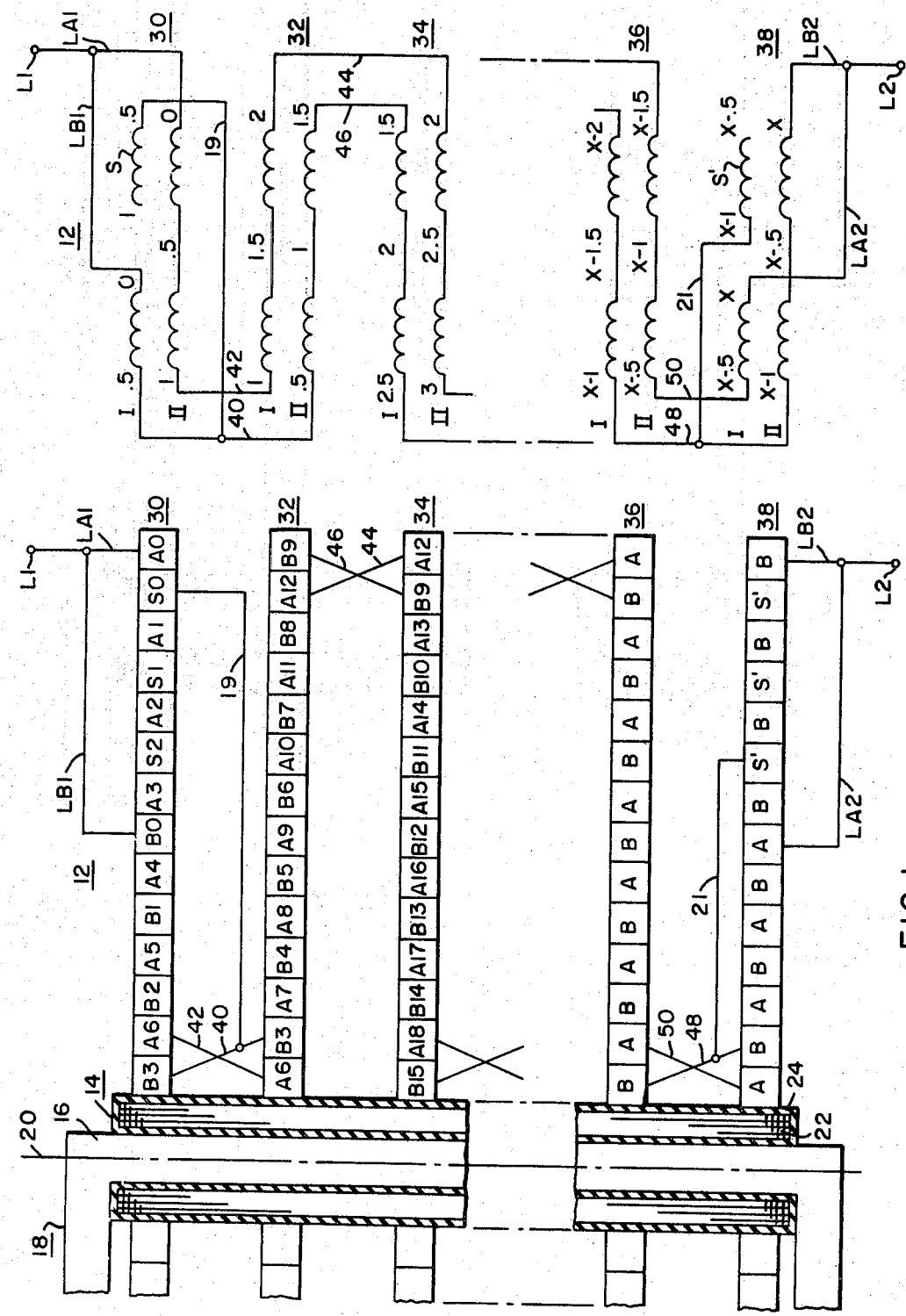

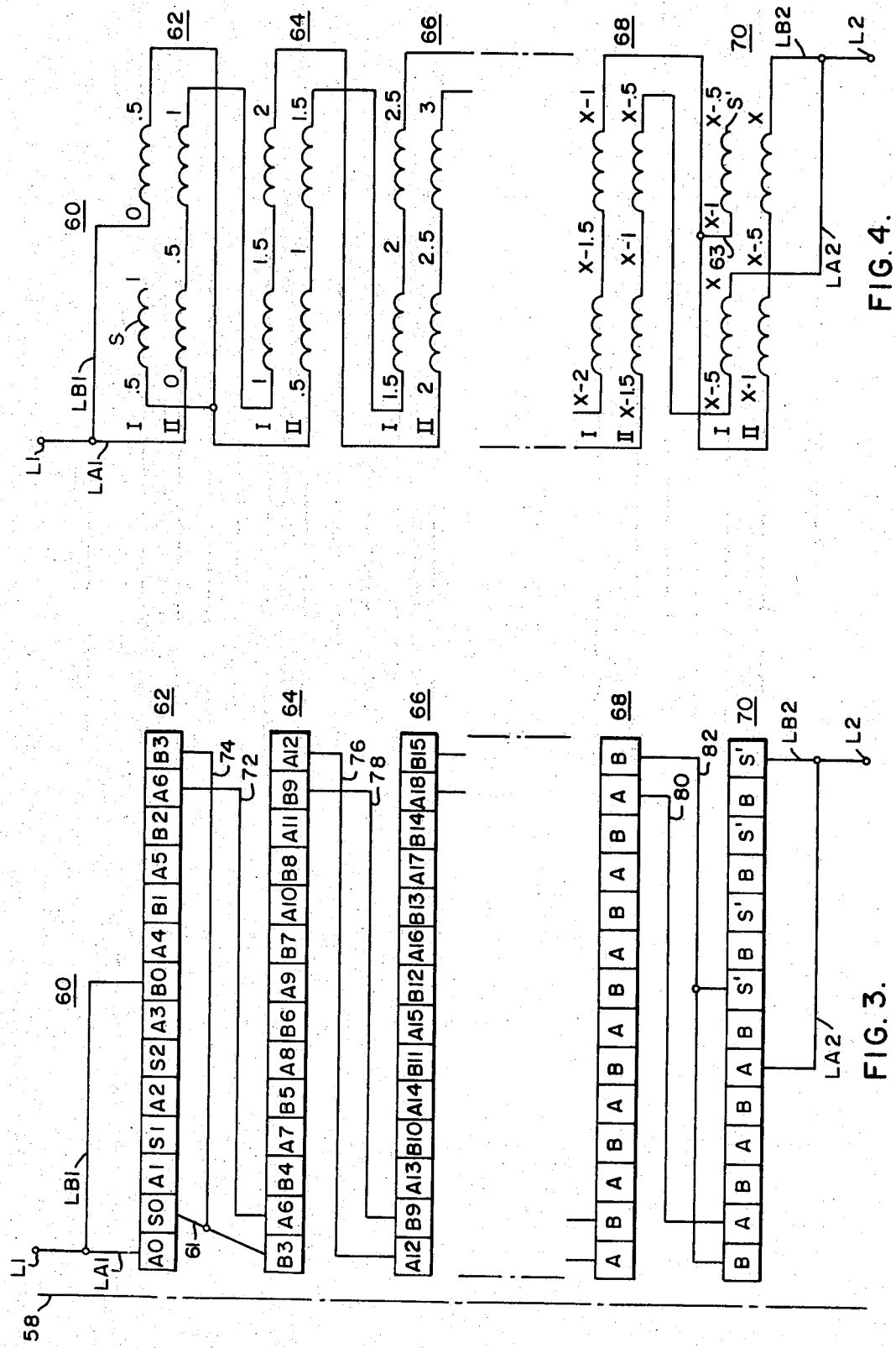

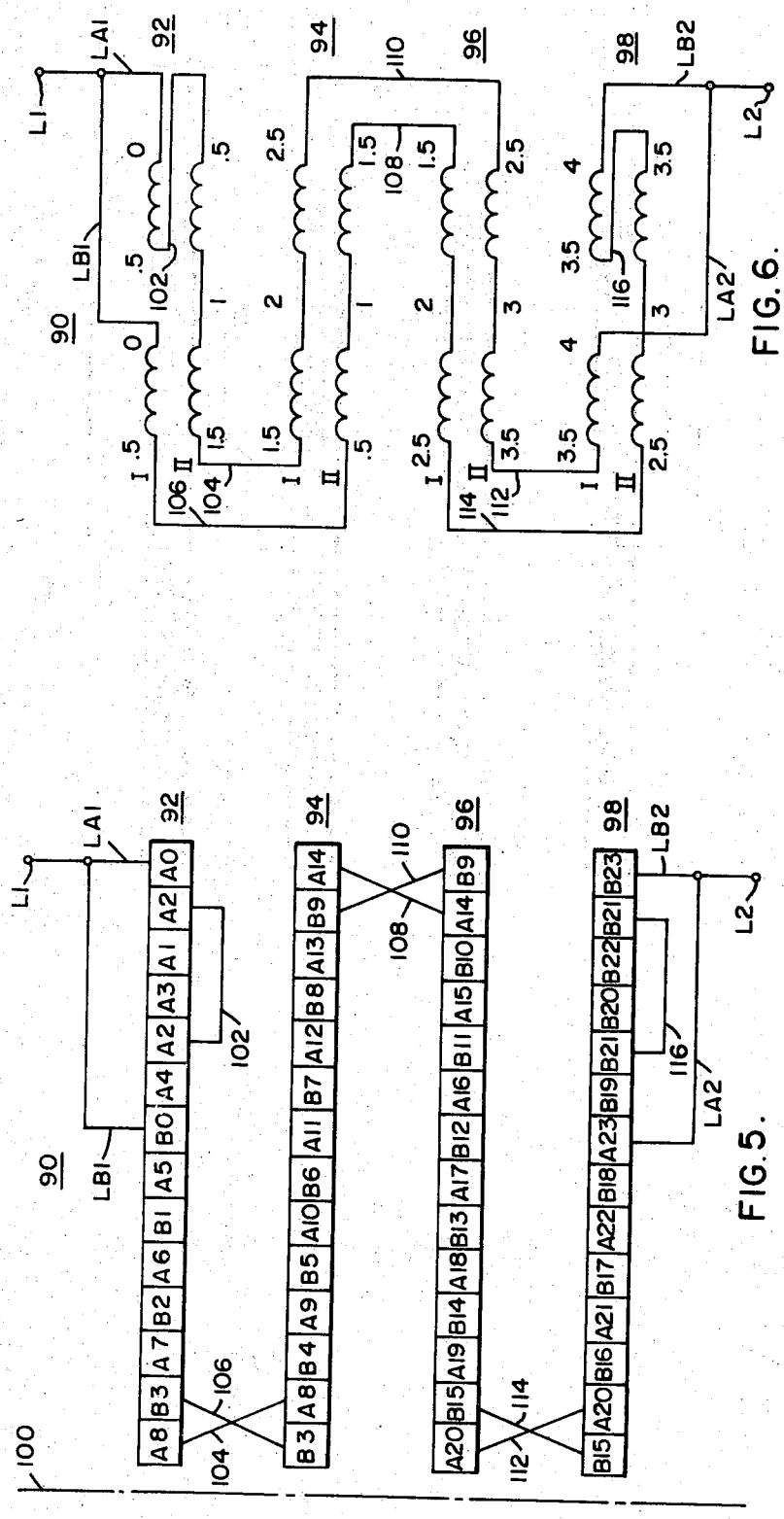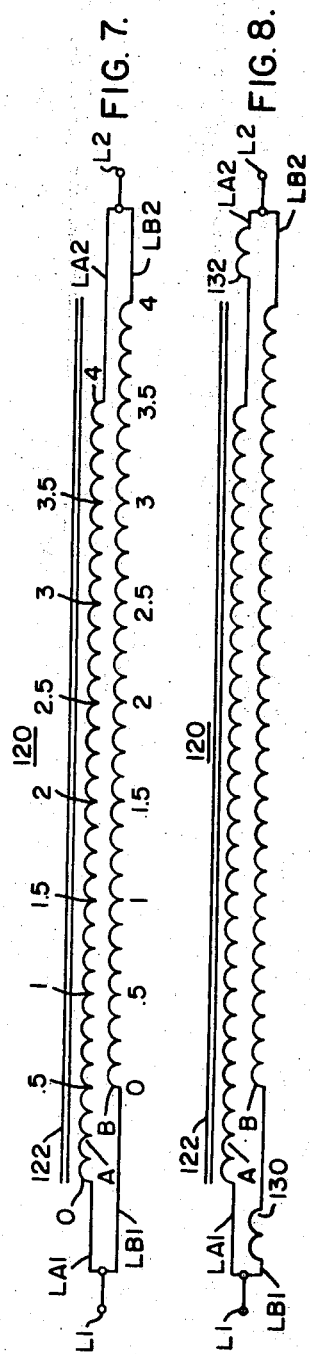

United States Patent Office 3,564,471
Patented Feb. 16, 1971

3,564,471
ELECTRICAL WINDINGS
Robert I. Van Nice, Sharon, Pa., assignor to Westinghouse Electric Corporation, Pittsburgh, Pa., a corporation of Pennsylvania
Filed Dec. 10, 1968, Ser. No. 782,637
Int. Cl. H01f 15/14
U.S. Cl. 336—70
11 Claims

ABSTRACT OF THE DISCLOSURE

Electrical windings of the high series capacitance, interleaved turn type, having at least first and second parallel paths between its electrical ends. In a first embodiment of the invention, the windings include a plurality of electrically connected pancake coils, each having at least two parallel electrical paths, with the pancake coils at each electrical end of the winding being constructed to provide a voltage difference between the two electrical paths at line and surge frequencies, which is maintained throughout the remaining pancake coils. The remaining pancake coils are constructed with first and second conductors, continuously radially interleaved across the build of the pancake coil. In another embodiment, all of the pancake coils are of the continuous type, with each parallel circuit including impedance means which has substantially the same impedance as each of the pancake coils at surge frequencies, but negligible impedance at line frequency. In this embodiment, a voltage difference between adjacent turns of the first and second parallel circuits is created only during a surge potential.

BACKGROUND OF THE INVENTION

(1) Field of the invention

The invention relates in general to electrical inductive apparatus, and more specifically to core-form electrical inductive apparatus having an electrical winding of the interleaved turn, high series capacitance type.

(2) Description of the prior art

Certain types of power transformers of the core-form type, i.e., those having concentrically disposed high and low voltage windings, have a high voltage winding structure formed of a plurality of continuous disc or pancake type coils. These pancake coils are disposed in spaced, side-by-side relation, and are serially connected in a predetermined manner to form the winding. This type of winding structure inherently distributes surge potentials in a non-linear manner, from turn-to-turn in the pancake coils, between the pancake coils across the winding structure, and from the pancake coils to ground. This non-linearity is such that the major portion of the electrical stress from a surge potential is concentrated at the line end of the winding structure, or at the line ends in those applications where both ends of the winding are connected to the line. The degree of non-linearity of surge voltage distribution is indicated by the magnitude of the distribution constant α of the winding, which is equal to the square root of the ratio of the capacitance $C_g$ of the winding structure to ground, to the through or series capacitance $C_s$ of the structure. The smaller the distribution constant α, the more linear will be the distribution of a surge potential across the turns of the pancake coils, between the pancake coils across the winding structure, and from the pancake coils to ground.

As evidenced by the distribution constant, increasing the effective series capacitance of the pancake coils, and of the winding structure, will improve the distribution of surge voltages across the winding. An excellent method of increasing the effective series capacitance of the pancake coils and the winding structure, is to spirally wind the pancake coils with two or more electrically conductive strands, and to electrically interconnect the strands with each other, and/or with conductive strands of other pancake coils in the winding, such that the electrically connected turns are separated or interleaved by one or more turns from an electrically different portion of the winding structure, which increases the voltage between turns and increases the amount of energy stored in the winding at any instant.

Many different interleaving structures and arrangements are known in the art, such as those disclosed in U.S. Pats. 3,090,022 issued May 14, 1963, 3,278,879 issued Oct. 11, 1966, 3,299,385 issued Jan. 17, 1967, and 3,246,270 issued Apr. 12 1966, all assigned to the same assignee as the present application, and U.S. Pat. 3,260,978, issued July 12, 1966.

When the current rating of an electrical winding structure is increased, the cross-sectional area of the electrical conductor must be increased accordingly. To reduce losses in the winding structure due to eddy currents, the conductor may be subdivided into two or more conductive strands which are insulated from one another, except at the start and finish ends of the winding structure, and at any tap connection points on the winding. The reduction in eddy current losses by stranding the conductor should be accompanied by transposing the relative positions of the strands, in order to minimize voltage unbalance in the parallel circuits, which may cause losses due to circulating currents in the parallel paths.

While the process of interleaving conductor turns in a pancake coil, to increase the effective series capacitance of the coil and electrical winding, substantially improves the distribution of a surge potential across the pancake coils and winding, the interleaving arrangements of the prior art are rather complex due to the interleaving connections which must be bent and/or welded or brazed, and reinsulated and protected by specal insulating channel members. When the electrical winding requires only one series path, these problems are not too significant. When the conductor must be subdivided into a plurality of parallel paths, however, the windings become even more complex and costly due to the increased number of interleaving connections. Further, transpositions of multiple conductor interleaved windings sometimes present a mechanical problem in arranging the relative locations of the interleaving and interpancake connections. Further, some interleaving ararngements require connections from one pancake coil to enter another pancake coil which is not adjacent to it, which complicates the interconnections between pancakes. Also, a large number of different interleaving arrangements are required in the prior art, in order to obtain different degrees of interleaving, i.e., different voltage magnitudes between adjacent interleaved turns, as required by specific windings or portions thereof.

Thus, it would be desirable to be able to obtain the benefits of interleaving, i.e., an electrical winding having a high effective series capacitance, while retaining the manufacturing advantages of the continuous type pancake coil, at least throughout the major portion of the electrical winding, especially with windings which employ a plurality of parallel connected circuits in order to provide the necessary current carrying capacity without excessive losses due to eddy currents.

SUMMARY OF THE INVENTION

Briefly, the present invention is a new and improved high series capacitance electrical winding structure of the type which employs a plurality of parallel connected circuits. In a first embodiment of the invention, all of the pancake coils, except the coil at each electrical end of the winding, are of the continuous type, each having at least first and second radially interleaved conductors which are from at least first and second parallel circuits, with the conductors traversing the complete radial build of the pancake coil. A predetermined voltage difference between adjacent turns of these continuous type coils is provided by utilizing pancake coils at the electrical ends of the winding, in which the circuits have a different number of turns in each coil, but the same total number of turns in the two end coils, with the number of turns in each circuit in each coil being selected and disposed relative to one another to provide the desired difference in voltage between the turns. The voltage difference between turns is provided at both the power line frequency and at the surge frequencies, to increase the effective series capacitance of the winding.

In another embodiment of the invention, all of the pancake coils are of the continuous type, each having at least two parallel circuits, with a voltage difference being provided between adjacent turns of the parallel circuits only during a surge potential, which increases the effective series capacitance of the winding when it is required. Each parallel circuit through the winding has adjacent first and second ends, with the first and second ends of the first and second parallel circuits each having impedance means serially connected thereto, before the two circuits are connected in common at each end thereof. The impedance means is selected to provide an impedance which is substantially the same impedance as each of the pancake coils at the surge frequencies, while having a negligible impedance at power line frequency.

BRIEF DESCRIPTION OF THE DRAWINGS

Further advantages and uses of the invention will become more apparent when considered in view of the following detailed description and drawings, in which:

FIG. 1 is an elevational view of a portion of a transformer having an electrical winding constructed according to the teachings of the invention, with the electrical winding having a plurality of pancake coils connected start-start, finish-finish, and utilizing shielding means to increase the effective series capacitance of the end coils;

FIG. 2 is a schematic diagram of the electrical winding shown in FIG. 1;

FIG. 3 is a diagrammatic view of an electrical winding similar to the electrical winding shown in FIG. 1, except with its pancake coils being connected finish-start;

FIG. 4 is a schematic diagram of the electrical winding shown in FIG. 3;

FIG. 5 is a diagrammatic representation of an electrical winding similar to the winding shown in FIG. 1, except utilizing self-interleaving to increase the effective series capacitance of the end coils;

FIG. 6 is a schematic diagram of the electrical winding shown in FIG. 5;

FIG. 7 is a schematic diagram which generally illustrates the embodiments of the invention shown in FIGS. 1–6;

FIG. 8 is a schematic diagram, similar to that shown in FIG. 7, except illustrating how circulating currents in the parallel connected circuits may be reduced by using compensating windings disposed to link the linkage flux but not the magnetic core;

DECRIPTION OF PREFERRED EMBODIMENTS

Figure 9:
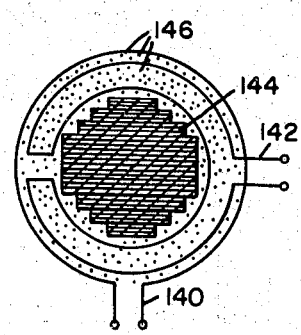
FIG. 9 is a diagrammatic representation of how the compensating windings shown in FIG. 8 may be arranged to link leakage flux without linking the magnetic core.

Referring now to the drawings, and FIG. 1 in particular, there is shown an elevational view of a portion of a transformer 10, which is of the type which may utilize the teachings of the invention. Transformer 10, which is of the core-form type, includes concentric high and low voltage windings 12 and 14, respectively, disposed in inductive relation about a leg 16 of a magnetic core assembly 18. Since the winding assemblies 12 and 14 are symmetrical about center line 20, only half of the high voltage winding 12 is completely shown in FIG. 1. Transformer 10 may be single or polyphase, but since each phase of a polyphase embodiment would be similar to the phase of a single phase embodiment, only one phase is illustrated in FIG. 1.

The low voltage winding assembly 14 may be of any suitable construction, having a plurality of turns 22 insulated from the magnetic core 18 and high voltage winding 12 by insulating means 24.

High voltage winding assembly 12 is of the type which includes a plurality of pancake or disc type coils, such as pancake coils 30, 32, 34, 36 and 38, which are disposed in spaced, side-by-side relation, with their coil openings in alignment.

The plurality of pancake coils are electrically connected to complete the winding assembly 10, as will be hereinafter explained, with only three pancake coils 30, 32 and 34 being shown at one end of winding 12, and two pancake coils 36 and 38 being shown at the other end. As many additional pancake coils may be connected between pancake coils 34 and 36, as required by a specific application, but they would be constructed similar to pancake coils 34 and 36, and, therefore, it is not necessary to include them in the drawing. Also, the number of conductor turns shown in the pancake coils is for illustrative purposes only, with the pancake coils used in an actual winding generally having more turns.

High voltage winding 12 is of the type which has a plurality of parallel connected circuits, in order to increase the current carrying capacity of the winding without excessive losses due to eddy currents. High voltage winding 12 is illustrated in FIG. 1 as having two parallel circuits, designated the A and B circuits, which are connected in common at terminals L1 and L2 at the electrical ends of the winding, but it will be understood from the following description how a larger plurality of parallel circuits may be utilized, when necessary to obtain still higher current ratings.

The general object of the invention is to obtain the advantages of interleaving for multiple circuit windings, which increases the voltage between adjacent conductor turns of the parallel circuits, and thus increases the stored energy in the winding at any one instant according to the formula $W = \frac{1}{2}CV^2$, in which W is the energy stored between two turns, C is the capacitance of the two turns, and V is the voltage across the turns, without the disadvantages of prior art interleaving arrangements for multiple circuit windings, which are complicated by the various interleaving and interpancake connections, and their relative locations necessary to obtain transpositions of the parallel circuits. This general object is achieved, according to a first embodiment of the invention, by utilizing a different number of turns in the parallel connected circuits, at least in the two pancake coils 30 and 38 disposed at the electrical ends of the winding, with the total number of turns of each parallel circuit in these two pancake coils being equal to one another. Further, the turns of each parallel circuit do not start together, i.e., they are electrically and mechanically shifted, in order to obtain the desired voltage between them. The pancake coils connected between these two ends coils may then be of the continuous type, wherein each parallel circuit simply starts near one edge of the coil and spirals completely through the coil build, without any interleaving connections. Further, all interpancake connections are made between adjacent pancake coils, with no interconnections between distant pancakes. Since there are no interleaving connections, interference between interleaving connections and interpancake connections is eliminated, as well as the cost of making the connections, and the circuits may be easily transposed between pancakes to reduce circulating currents.

More specifically, pancake coil 30 of FIG. 1 is connected to terminal L1 via conductors LA1 and LB1. Terminal L1 may be adapted for connection to the high voltage electrical circuit. In this embodiment of the invention, the pancake coils are connected start-start, finish-finish, with the "start" of the pancake coil being at the ends of the innermost turns of the parallel circuits or paths through the coils, and the "finish" of a pancake coil being at the ends of the outermost turns of the parallel paths, regardless of where the circuits first enter the pancake coils. Thus, the A and B circuits enter the outermost turns of their respective parallel paths in pancake coil 30. However, instead of the A and B circuits starting together, which would make adjacent turns electrically similar, with substantially no voltage difference between them, one of the circuits has fewer turns than the other, and the circuit with the fewer turns is interleaved with the circuit having the larger number of turns, starting at a point electrically distant from the point where the line conductor first enters the circuit having the larger number of turns. Thus, the A circuit may start at the end of the outermost turn of pancake coil 30, with the turns being referenced with a letter to identify the circuit therefrom, and a number to indicate their electrical position relative to the terminal L1. The A circuit spirals inwardly, completely through the coil build, appearing at turns A1, A2, A3, A4 and A5. The B circuit, in this example, starts between turns A3 and A4 of the A circuit, and spirals inwardly appearing at turns B1, B2 and B3, with the starting point of the B circuit being selected according to the voltage difference desired between the turns of the parallel connected circuits. To obtain a different degree of interleaving, i.e., different voltages between the turns, the point at which the B circuit starts is selected to provide this desired voltage. In this embodiment of the invention, the B circuit has one-half the number of turns of the A circuit in pancake coil 30, and thus the difference in voltage between the turns is equal to one-half the voltage across one pancake coil, which is a degree of interleaving similar to that obtainable utilizing the teachings of single interleaving.

By only partially interleaving the B circuit with the A circuit in pancake coil 30, the portion of the A circuit which is not mutually interleaved with the B circuit will not have a substantial voltage difference between adjacent turns and will thus have a low effective series capacitance, which will cause surge potentials to concentrate on this portion of the coil. Thus, it is essential that the effective series capacitance of the uninterleaved portion of pancake coil 30 be the same as the mutually interleaved portion of this pancake coil, and this is accomplished, in this embodiment of the invention, by shielding these uninterleaved turns with a conductor or shield S, which is interleaved therewith and which has one end connected to a point in the electrical circuit which will provide the desired voltage difference between the shield and the turns from the A circuit it is interleaved with. The other end of the shield is unconnected. Thus, the shield may enter a conductor interleaved between turns A0 and A1, at the end of conductor S0, and spiral inwardly, appearing at turns S1 and S2. If another turn is desired for the shield, the shield may start outside of turn A0. Conductor S0 is connected via conductor 19 to a point further along in the circuit to obtain the same voltage difference between the shield and the adjacent turns of the A circuit, as between the mutually interleaved turns of the A and B circuits, for example, to the crossover connection 40 which interconnects the B circuits of pancake coils 30 and 32.

The A and B circuits, and the shield S, may be formed by spirally winding first and second conductors together, and then severing one of the conductors, such as the first conductor at its midpoint. The severed conductor will then provide both the B circuit through the pancake coil 30, and the shield S. Since the shield S does not carry load current, however, it may be formed of a separate conductor, if desired, which has the same width as the load conductors, but a smaller thickness dimension.

Since the voltage difference between the A and B circuits has been established in pancake coil 30, the pancake coils intermediate the end coils 30 and 38 may be formed by winding two conductors together to form the A and B circuits, the turns of which completely traverse the coil build. In other words, the intermediate pancake coils are of the continuous type, formed in the same manner as two conductor coils for non-interleaved type windings of the prior art. Thus, pancake coil 32 may be formed by radially winding first and second conductors together, and connecting the A circuit from pancake coil 30 to the end of the innermost turn, referenced A6, of the first conductor, via the interpancake start-start connection 42. The first conductor is selected in pancake coil 32, since the A circuit traversed the second conductor in pancake coil 30, which therefore transposes the position of the A circuit in pancake coils 30 and 32. The first and second conductors, hereinbefore referred to, refer to their relative positions adjacent a mandrel, for starting the winding of the conductor turns. The two conductors connected by interpancake connection 42 are both referenced A6, in order to illustrate that the ends of these two turns are at substantially the same potential.

The A circuit spirals outwardly in pancake coil 32, appearing at every other turn referenced A7, A8, A9, A10, A11 and A12.

The B circuit is connected from pancake coil 30 to pancake coil 32, via start-start interpancake connection 40, with the B circuit entering the innermost turn of the second conductor, referenced B3, in order to transpose the relative positions of the B circuit in pancake coils 30 and 32. The B circuit spirals outwardly in pancake coil 32, appearing at every other turn referenced B4, B5, B6, B7, B8 and B9.

The next pancake coil 34 is similar to pancake coil 32, except the A and B circuits spiral inwardly, instead of outwardly, with the A and B circuits from pancake coil 32 being connected to pancake coil 34 via interpancake finish-finish connections 44 and 46, respectively. The relative positions of the A and B circuits are again transposed in pancake coils 32 and 34, with the A circuit entering the second conductor, and the B circuit entering the first conductor, of pancake coil 34, with reference to the relative starting positions of the innermost turns of the conductors. The following pairs of pancake coils across the winding are similar to pancake coils 32 and 34, with the next to the last pancake coil 36 being similar to pancake coil 34. Pancake coil 36 is connected to pancake coil 38 via interpancake start-start connections 48 and 50.

The last pancake coil 38 is connected to terminal L2, which may be adapted for connection to another line terminal, or to ground, depending upon the specific application, via conductors LA2 and LB2, with pancake coil 38 having twice as many turns from the B circuit as from the A circuit, in order to provide the same total number of turns in each parallel circuit, and allow the parallel circuits to be interconnected at their ends without a large circulating current flowing due to a voltage unbalance.

The A and B circuits spiral outwardly together in pancake coil 38, with the A circuit stopping at substantially the midpoint of the coil build, while the B circuit continues to spiral outwardly. When the A circuit is terminated, the B circuit continues to spiral outwardly, interleaved with a shield S' which will provide the same voltage difference between the shield and the adjacent turns from the B circuit, as between the interleaved turns of the A and B circuit. For example, the inner end of the shield may be connected to the cross-over connector 48 between pancake coils 36 and 38, via conductor 21.

FIG. 2 is a schematic diagram of the high voltage winding 12, which is shown diagrammatically in FIG. 1, which clearly illustrates the voltage difference between the A and B circuits, and between the shields S and S' and the A and B circuits, respectively. The inner or first conductor, and the outer or second of the two conductors, of each pancake coil, are referenced I and II, respectively, to illustrate the transposition of the A and B circuits from pancake coil to pancake coil, and the voltage across each half of each pancake coil section is indicated, using the voltage across one pancake coil as one unit of voltage. Thus, the A circuit, which enters section II of pancake coil 30, picks up one-half unit of voltage before being interleaved with the B circuit. Thus, the voltage difference between the A and B circuits is one-half unit, and as illustrated, this difference is maintained throughout the winding. In order to obtain a voltage difference of one-half unit between the shield S and the A circuit in pancake coil 30, the outermost turn of the shield S may be connected to the cross-over connection 40 between the B circuits of pancake coils 30 and 32, which is at one-half unit voltage. In like manner, in order to obtain a voltage difference of one-half unit between the shield S' and the B circuit in pancake coil 38, the innermost turn of the shield S' may be connected to the crossover connection 48 between the B circuits of pancake coils 36 and 38, which is at a voltage of $X-1$ units, where X is the voltage at terminal L2. As shown in FIG. 2, the A circuit alternates between sections II and I across the winding, and the B circuit alternates between sections I and II across the winding, to transpose the relative positions of the A and B circuits from pancake coil to pancake coil.

In the embodiment of the invention shown in FIGS. 1 and 2, the pancake coils are illustrated as being start-start, finish-finish connected. It would be equally suitable to connect the pancake coils with finish-start connections, which has the advantage of enabling all machine wound coils to be used, as the circuits spiral outwardly in all of the pancake coils. FIGS. 3 and 4 are diagrammatic and schematic representations of a high voltage winding 60, which is similar to high voltage winding 12 shown in FIGS. 1 and 2, except the pancake coils are finish-start connected. More specifically, high voltage winding 60 includes a plurality of pancake type coils, with pancake coils 62, 64 and 66 being shown serially connected to the line terminal L1 at one end of the winding, and with pancake coils 68 and 70 being shown serially connected to the terminal L2 at the other end of the winding. As hereinbefore explained, any number of pancake coils may be connected between pancake coils 66 and 68. In pancake coil 62 disposed at the first electrical end of winding 60, the A circuit and a shield S are wound together for substantially the first half of the radial build of the coil, and then the A and B circuits spiral outwardly together for the remaining build dimension of the coil. The electrical shield is connected in the circuit to provide the desired voltage between the A circuit and the shield, such as the cross-over connection 74 between the B circuits of pancake coils 62 and 64, with the shield being connected to the cross-over connection via conductor 61. At the end of the outermost turns of the A and B circuits of pancake coil 62, the A and B circuits enter the innermost turns of the pancake coil 64 via interpancake finish-start connections 72 and 74. Since the A and B circuits traverse the first and second conductor positions of pancake coil 62, the A circuit will enter the second conductor position and the B circuit will enter the first conductor position of pancake coil 64, in order to transpose the relative positions of the A and B circuits. All of the remaining pancake coils, except the pancake coil 70 connected to the other electrical end of the winding, are of the two conductor continuous type, each having two conductors radially wound together throughout the radial build dimensions of the coils. Further, since all of the interpancake connections are finish-start, all of the pancake coils between the two line end pancake coils, will be similar in construction. For example, the A and B circuits spiral outwardly together through pancake coil 64, and they are connected via interpancake finish-start connections 76 and 78 to the first and second conductors of pancake coil 66. The A and B circuits then spiral outwardly through pancake coil 66, and return to the start of the next pancake coil. The A and B circuits enter the last pancake coil 70 from pancake coil 68 via interpancake connections 80 and 82, and the A and B circuits spiral outwardly together for half of the coil build. At this point the A circuit is terminated and connected to terminal L2 via conductor LA2. The B circuit continues to spiral outwardly, interleaved with a shield S', with the shield S' being connected via conductor 63 to the cross-over connection 82 between the B circuits of pancake coils 68 and 70. At the termination of the B circuit, it is connected to the terminal L2 via connection LB2.

FIG. 4 is a schematic diagram of the winding 60 shown in FIG. 3, which illustrates the voltage difference between the mutually interleaved turns of the A and B circuits, and between the shields S and S' and the A and B circuits, respectively. Since the A circuit has twice as many turns as the B circuit in pancake coil 62, and the B circuit has twice as many turns as the A circuit in pancake coil 70, the difference between the mutually interleaved circuits is equal to one-half unit voltage. Any other degree of electrical interleaving may be achieved, by merely changing the ratio of the number of turns in the two circuits.

In the embodiments of the invention shown in FIGS. 1–4, the pancake coils disposed at the electrical ends of the winding have the effective series capacitance of the turns of the parallel path which are not mutually interleaved with turns from the other parallel path, increased through shielding. It is also suitable to increase the effective series capacitance of the non-mutually interleaved turns of the end pancake coils through self-interleaving, wherein the portion of the parallel circuit not interleaved with the other parallel circuit is interleaved with itself. FIGS. 5 and 6 are diagrammatic and schematic diagrams, respectively, which illustrate this embodiment of the invention. More specifically, FIG. 5 illustrates an electrical winding 90, which is symmetrical about center line 100, having a plurality of pancake coils, such as pancake coils 92, 94, 96 and 98, which are serially connected between the terminals L1 and L2. In this example, electrical winding 90 is illustrated as being start-start, finish-finish connected, but it is to be understood that it could also be finish-start connected, if desired. Pancake coil 90 includes two parallel circuits, referenced the A and B circuits, with the A circuit entering the end of the outermost turn of pancake coil 92, and with the B circuit entering a turn at substantially the midpoint of the pancake coil, in order to provide a voltage difference between the interleaved A and B circuits of one-half unit voltage. A high effective series capacitance may be obtained for the portion of the A circuit in pancake coil 92, which is not interleaved with the B circuit, by self-interleaving the turns of the A circuit, wherein the A circuit enters the end of the outermost turn at conductor A0 and spirals inwardly, appearing at every other turn referenced A1 and A2. At the end of A2, the circuit returns, via interleaving connection 102 to a turn which is intermediate the turns A0 and A1, entering conductor A2 and spiraling inwardly, appearing at turns A3, A4, A5, A6, A7 and A8. Starting with turn A4, the A circuit is interleaved with the B circuit, with the B circuit starting at conductor B0 disposed between turns A4 and A5. Pancake coils 94 and 96, disposed intermediate the electrical ends of winding 90, are of the two conductor continuous type, as hereinbefore described relative to FIG. 1, with the A and B circuits leaving pancake coil 92 via interpancake connections 104 and 106, and entering the innermost turns of pancake coil 94. The relative positions of the A and B circuits are transposed between pancake coils 92 and 94, and the A and B circuits then spiral outwardly until reaching the ends of the outermost turns of pancake coil 94. The A and B circuits then proceed via interpancake connections 108 and 110, respectively, to the outermost turns of pancake coil 96, again transposing the relative positions of the A and B circuits, and the A and B circuits spiral inwardly until reaching the ends of the innermost turns of pancake coil 96. The A and B circuits then proceed to the innermost turns of pancake coil 98, via start-start connections 112 and 114, again transposing the positions of the A and B circuits, and the A and B circuits spiral outwardly together until reaching substantially the midpoint of the coil build. The A circuit is then terminated, leaving pancake coil 90 via conductor LA2, which is connected to the terminal L2. The B circuit continues to spiral outwardly, appearing at every other turn B19, B20 and B21, at which point the circuit returns via interleaving connection 116 to a turn B21 disposed between turns B19 and B20, and then the B circuit spirals outwardly again appearing at turns B22 and B23. At the end of the outermost turn, B23, the B circuit is connected to terminal L2 via conductor LB2.

FIG. 6 is a schematic diagram of the electrical winding 90 shown in FIG. 5, which illustrates the self-interleaving of the A circuit in pancake coil 92, and of the B circuit in pancake coil 98, in order to increase the effective series capacitance of the end pancake coils, containing the non-mutually interleaved portions of the circuit. The schematic diagram of FIG. 6 also illustrates the unit voltage difference between the mutually interleaved A and B circuits, with a voltage difference of one-half unit being maintained between the two circuits throughout the electrical winding. By starting the B circuit at a different point in pancake coil 92, different degrees of interleaving may be achieved, as hereinbefore described.

FIG. 7 is a schematic diagram which illustrates a complete electrical winding assembly 120, with the parallel connected A and B circuits or conductors of the pancake coils, which are disposed in inductive relation with a magnetic core 122, extending in a straight line and connected to terminals L1 and L2. This schematic diagram clearly illustrates the flexibility of the disclosed teachings of being able to obtain the desired degree of interleaving without resorting to complicated interleaving arrangements. By merely moving one of the circuits relative to the other, any desired degree of interleaving may be achieved.

If the extra or additional turns which are not mutually interleaved at the ends of the winding do not link the same number of lines of leakage flux, there is a possibility of creating a voltage difference between the parallel connected A and B circuits sufficient to create undesirable circulating currents, even though the parallel circuits are transposed between each pancake coil. If this occurs, the magnitude of the circulating currents may be substantially reduced by adding compensating windings or turns to each of the parallel circuits, which link as much of the leakage flux as possible which is linked by the additional non-mutually interleaved turns, while being in non-inductive relation with the magnetic core 122. In other words, the compensating windings do not encircle or link the magnetic core, while they do link the leakage flux which is linked by the additional non-mutually interleaved turns, and provide a voltage in the compensating windings which bucks the voltage in the additional turns due to leakage flux. This embodiment of the invention is shown in the schematic diagram of FIG. 8, which is a winding similar to the winding of FIG. 7, but with compensating windings. Like reference numerals in FIGS. 7 and 8 indicate like components. Specifically, compensating winding 130 has been connected serially with the B circuit, between the B circuit and terminal L1, and disposed to link substantially the same leakage flux as the additional turns in the A circuit, and compensating winding 132 has been connected serially with the A circuit, between the A circuit and terminal L2, and disposed to link substantially the same leakage flux as the additional non-mutually interleaved turns of the B circuit. Therefore, the voltage in compensating winding 130 due to leakage flux, will be substantially equal to the voltage developed in the non-mutually interleaved turns of the A circuit due to leakage flux, since they are disposed to link substantially the same leakage flux, and their voltages will be opposed to one another, since they are disposed in opposite parallel circuits. Further, the voltage developed in compensating winding 132 due to leakage flux will be substantially equal to the voltage developed in the non-mutually interleaved turns of the B circuit, since they are disposed to link substantially the same leakage flux, and these voltages are opposed to one another since they are located in opposite parallel circuits. Since the effect of the leakage flux on the additional non-mutually interleaved turns has been substantially cancelled by the compensating windings, there will be very little voltage unbalance due to these additional turns, minimizing circulating currents in the parallel loops.

FIG. 9 diagrammatically illustrates how the voltage induced into the additional, non-mutually interleaved turns is due to the core flux and to the leakage flux, and how the compensating winding may be disposed to link the leakage flux without linking the core flux. The non-interleaved portion of the circuit and the compensating winding are each illustrated having one turn, with the non-interleaved portion of the winding being given the reference numeral 140, and the compensating winding being given the reference numeral 142. The additional or non-mutually interleaved turns 140 link leg 144 of the magnetic core, as well as leakage flux 146. The compensating winding 142 links the leakage flux 146, but does not complete a turn about the core leg 144. By connecting winding 140 and 142 such that their induced voltages buck one another, the resultant voltage would be due entirely to that induced in winding 140 by the flux in the magnetic core leg 144.

Figure 10:
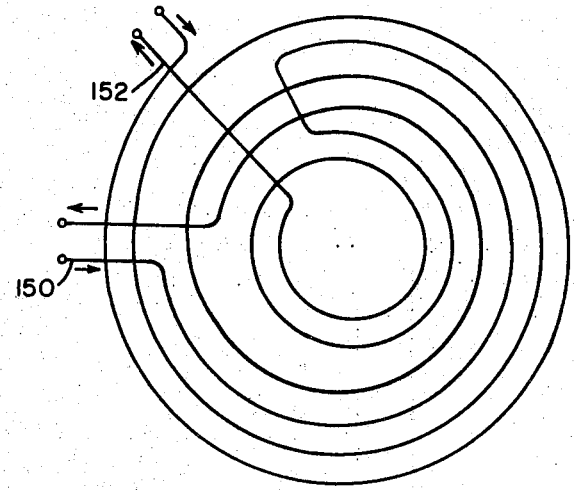
FIG. 10 is a schematic representation of another arrangement for the compensating windings shown in FIG. 8.

FIG. 10 is a schematic diagram which illustrates another arrangement for the additional non-mutually interleaved turns and the compensating winding, with each being shown having a plurality of turns in this embodiment. Specifically, FIG. 10 illustrates the additional non-mutually interleaved turns 150, and a compensating winding 152. The additional non-mutually interleaved turns 150 encircle the core flux and the leakage flux, while the turns of the compensating winding 152 encircle the leakage flux but are constructed to cancel out any inductive effect due to core flux. In other words, it should be noted that half of the turns of the compensating winding encircle the core leg in one direction, and the other half encircle the core leg in the other direction, which cancels any effect due to the core flux. Shielding means (not shown) may be necessary in the compensating windings, as hereinbefore described relative to the additional non-mutually interleaved turns, in order to distribute surge voltages uniformly across turns of the compensating windings.

All of the hereinbefore described embodiments of the invention have disclosed new and improved arrangements for increasing the voltage between the turns of parallel circuits of pancake coils, to thus increase the effective series capacitance of the pancake coils and the winding which they form, with the voltage increase being achieved at normal power frequency, such as 60 Hz., as well as at surge frequencies.

Figure 11:
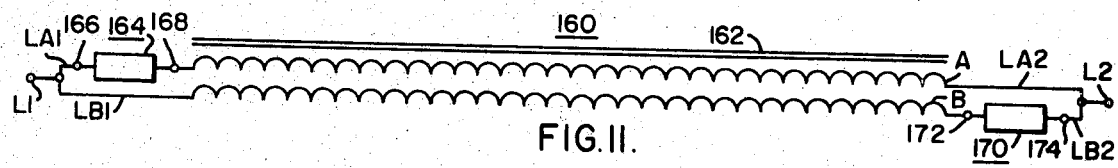
FIG. 11 is a schematic diagram of an electrical winding constructed according to another embodiment of the invention, which utilizes impedance means to increase the effective series capacitance of the windings.

The purpose of increasing the effective series capacitance of a winding, however, is to distribute surge potentials more uniformly across an electrical winding, and it has nothing to do with the normal operation of the winding at power line frequency. This realization also allows the major object of the invention to be achieved, i.e., of producing high series capacitance windings without resorting to complicated interleaving arrangements, with FIG. 11 illustrating an embodiment of the invention which is based upon this realization. In the hereinbefore described embodiments, all of the pancake coils of an electrical winding, except the pancake coils disposed at the two electrical ends of the winding, are of the continuous type. In this embodiment of the invention, all of the pancake coils, including the end coils, are of the continuous type. FIG. 11 schematically illustrates this aspect, including an electrical winding 160 having a plurality of serially connected pancake coils which are shown connected together in a straight line, with each pancake coil having at least two parallel circuits, referenced the A and B circuits, the turns of which are mutually interleaved, and disposed in inductive relation with a magnetic core 162. The A and B circuits have impedance means 164 and 170 connected serially therewith, respectively, with impedance means 164 having terminals 166 and 168, and impedance means 170 having terminals 172 and 174. The A circuit has one end connected to terminal L1 through impedance means 164, and conductor LA1, and its other end connected to terminal L2 via conductor LA2. The B circuit has one end connected to terminal L1 via conductor LB1, and its other end is connected to terminal L2 via impedance means 166 and conductor LB2.

Impedance means 164 and 166 are selected to have a negligible impedance at power line frequency, such as 60 Hz., while possessing a high impedance to surge frequencies. At conventional power line frequencies, the voltages of adjacent mutually interleaved turns of the A and B circuits will be substantially the same. When the winding is subjected to a surge potential, the impedance of the impedance means 164 and 166 to the high frequency currents of the surge will create a voltage drop across the impedance elements, and thus a voltage difference will be created between adjacent mutually interleaved turns. The voltage increase between turns will increase the effective series or through capacitance of the winding, while the winding is being subjected to the surge, distributing the surge potential more uniformly across the winding.

While impedance means 164 and 166 may be any device which possesses the requisite characteristics, such as a resistive element having its surface prepared to present a high impedance to the high frequency surge currents which flow near the surface of a conductor due to skin effect, or a choke coil or inductor wound to have the desired impedance at high frequencies, it is preferable to utilize a transmission line resonator which is constructed to have the same first resonant frequency as each of the pancake coils. The first resonant frequency for a two conductor continuous type pancake coil is in the range of 1 mHz. to 4 mHz. for a typical power transformer winding. At power line frequency, the impedance of the resonator would be negligible.

Figure 12:
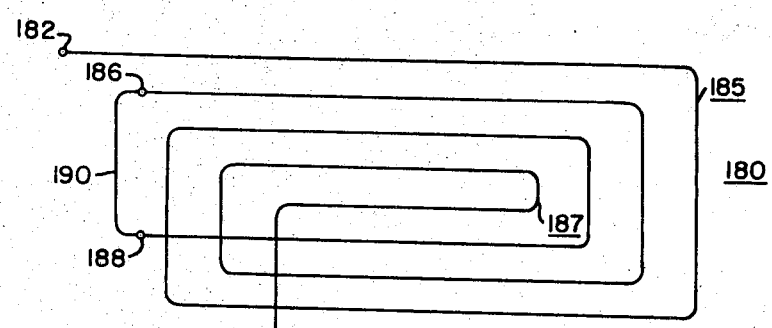
FIG. 12 is a schematic diagram illustrating how the impedance means shown in FIG. 11 may be constructed.

FIG. 12 is a schematic diagram of a transmission line resonator 180 illustrating a suitable method of construction for the resonator. Transmission line resonator 180 is of the interleaved turn type, having terminals 182 and 184, which would be connected serially with one of the parallel circuits, and a winding having first and second interleaved sections 185 and 187, respectively, interconnected by interleaving connection 190. The first section 185 is connected between terminals 182 and 186, and the second section 187 is connected between terminals 184 and 188. Terminals 186 and 188 of the two sections are interconnected by interleaving connection 190. In order to minimize unbalanced voltages in winding 160 when the transmission line resonator 180, shown in FIG. 12, is used as impedance means 164 and 170, shown in FIG. 11, due to differences in leakage flux linked by the resonators at the two electrical ends of the winding, the transmission line resonator preferably has its turns squashed close together, in order to link as little leakage flux as possible, and the transmission line resonator should be disposed in the transformer such that the turns are directed along the lines of leakage flux, rather than across them.

Figure 13:
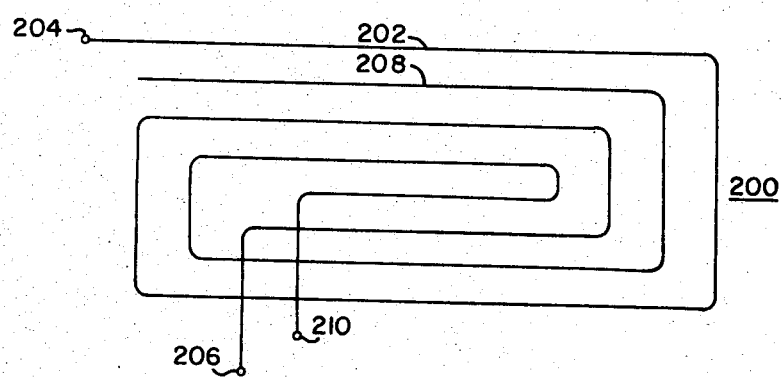
FIG. 13 is a schematic diagram illustrating another suitable construction for the impedance means shown in FIG. 11.

Instead of self-interleaving the turns of the transmission line resonator, as shown in FIG. 12, the transmission line resonator may utilize shielding to insure uniform distribution of transient voltages across it, with FIG. 13 illustrating a transmission line resonator 200 having a winding 202 connected between terminals 204 and 206. Winding 202 has a conductor 208 bound bifilarly with it, with conductor 202 providing the electrical shield. One end of the shield conductor 208 is connected to a terminal 210, which is adapted for connection to a point in the winding circuit which will provide the desired voltage difference between the shield and the turns of winding 202. Like the transmission line resonator 180 shown in FIG. 12, transmission line resonator 200 should also have its turns squashed closely together and disposed along the lines of leakage flux in its associated transformer.

The embodiment of the invention shown in FIG. 11, in addition to requiring only pancake coils of the continuous type, simplifies the making of tap connections to the parallel circuits, since adjacent turns of the parallel circuit are at the same voltage during normal line frequency conditions.

While all of the embodiments of the invention have been described relative to having two parallel circuits, it will be obvious that any number of parallel connected circuits may be used. In the embodiment of the invention wherein the parallel connected circuits are electrically shifted to provide the desired voltage between the circuits, it would merely be necessary to electrically and mechanically shift the start of each of the particular parallel circuits being used, with the sum of the turns of each of the parallel circuits, in the first and last pancake coils of the winding, all being equal to each other. In the embodiment of the invention wherein the voltage difference is obtained by impedance means, which has a high impedance to the high frequency surge currents, but a negligible impedance to line frequency, it would be necessary to select the impedance means to have different values of impedance at surge frequencies, such that adjacent radial conductors of the parallel circuits have a voltage between them at the surge frequencies.

In summary, there has been disclosed new and improved multi-circuit winding assemblies for power frequency inductive apparatus, such as transformers and reactors, which presents a high effective series capacitance to surge potentials, causing surge potentials to be more uniformly distributed across the electrical winding. In one embodiment of the invention, the turns of the parallel circuits are electrically and mechanically shifted in the coils at each electrical end of the winding, to provide a voltage difference between adjacent mutually interleaved turns of the parallel connected circuits, which allows all continuous type pancake coils to be used for the remaining pancake coils. The additional non-mutually interleaved turns of the end pancake coils are disposed in inductive relation with the magnetic core, and may be self-interleaved, or shielded, to increase their effective series capacitance. Additional compensating windings, not linked to the magnetic core, but which are disposed to link the same leakage flux as the additional nonmutually interleaved turns of the end pancake coils, may be used to reduce circulating currents due to the additional non-mutually interleaved turns linking different magnitudes of leakage flux.

In another embodiment of the invention, all of the pancake coils are of the continuous type, with the voltage between mutually interleaved turns of the parallel circuits being obtained via impedance means serially connected with the parallel circuits which presents a high impedance only to high frequency surge currents. These impedance means are not inductivly linked with the magnetic core, but are disposed separately therefrom in a position which minimizes their linkage with the leakage flux from the inductive apparatus. The impedance means are preferably transmission line resonators, which may be constructed to have the same resonant frequency as the pancake coils, which in themselves may be thought of as being transmission line resonators.

Thus, in both major embodiments of the invention, high series capacitance, interleaved turn pancake coils are provided while utilizing the simple construction of the continuous type pancake coils, at least in the major portion of the windings. Therefore, the advantages of interleaving are achieved without resorting to the relatively costly interleaving arrangements of the prior art, with the cutting, bending, brazing and re-insulating of interleaving connections being eliminated, at least in the major portion of the electrical windings.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. A high series capacitance winding comprising:
   a plurality of pancake coils,
   each of said pancake coils including a plurality of parallel paths, the turns of which are formed of a plurality of radially interleaved conductors,
   means interconnecting said pancake coils to provide a winding structure having the predetermined plurality of parallel circuits therethrough, each having first and second ends located at predetermined first and second pancake coils, respectively,
   the plurality of parallel paths in said predetermined first and second pancake coils each having a different number of turns, with the total turns for each path in said first and second pancake coils being equal to one another,
   said plurality of parallel paths in said predetermined first and second pancake coils being electrically shifted to provide a predetermined voltage between the radially interleaved turns of the parallel paths,
   the plurality of parallel paths in the remaining pancake coils each having a like number of turns which are radially interleaved with one another uniformly across the complete radial build of the pancake coils, to maintain the same voltage difference between the turns established by the electrical shifting of the parallel paths in said first and second predetermined pancake coils.

2. The high series capacitance winding of claim 1 wherein the plurality of pancake coils are disposed in side-by-side relation, and the predetermined first and second pancake coils are at the first and second physical ends, respectively, of the electrical winding.

3. The high series capacitance winding of claim 1 wherein the plurality of pancake coils are disposed in side-by-side relation, and the means interconnecting the plurality of pancake coils connects adjacent pancake coils, across the electrical winding.

4. The high series capacitance winding of claim 1 wherein the means interconnecting the plurality of pancake coils, connects them with successive start-start, finish-finish connections.

5. The high series capacitance winding of claim 1 wherein the means interconnecting the plurality of pancake coils connects them with finish-start connections.

6. The high series capacitance winding of claim 1 wherein the plurality of paralllel circuits through the winding each have the same number of turns, and including means interconnecting the plurality of parallel circuits at their first ends, and at their second ends.

7. The high series capacitance winding of claim 1 including shielding means disposed between at least certain of the turns of the parallel path in the predetermined first and second pancake coils which are not interleaved with the turns of another parallel path, said shielding means being electrically connected to one of the parallel circuits of the winding, to apply a predetermined voltage thereto, and provide a predetermined voltage difference between said shielding means and the turns interleaved therewith, in each of the predetermined first and second pancake coils.

8. The high series capacitance winding of claim 1 wherein at least certain of the turns of the parallel path, in the predetermined first and second pancake coils which are not interleaved with the turns of another parallel path, are self-interleaved, to place electrically distant turns between electrically connected turns, and increase the voltage between physically adjacent turns to a predetermined magnitude.

9. The high series capacitance winding of claim 1 including a magnetic core, the plurality of pancake coils being disposed in inductive relation with said magnetic core, each surrounding a predetermined portion thereof.

10. The high series capacitance winding of claim 9 including a plurality of electrical conductors wound to encircle the leakage flux from the magnetic core, while being in non-inductive relation with the magnetic core, said plurality of conductors being serially connected with said plurality of parallel circuits, respectively, to reduce the magnitude of circulating currents when the parallel circuits are connected in common at their first ends, and at their second ends.

11. A high series capacitance winding, comprising:
   a plurality of pancake coils,
   each of sad pancake coils including first and second parallel paths, the turns of which are formed of first and second radially interleaved conductors,
   means interconnecting said pancake coils to provide a winding structure having first and second parallel circuits therethrough, each having first and second ends located at predetermined first and second pancake coils, respectively,
   one of the parallel paths in each of said predetermined first and second pancake coils having more turns than the other parallel path, with the parallel paths selected to have the additional turns in said first and second pancake coils being in the first and second parallel circuits, respectively,
   said first and second paths in said predetermined first and second pancake coils being electrically shifted to provide a predetermined voltage between the radially interleaved turns of the two paths,
   the first and second parallel paths in the remaining pancake coils each having a like number of turns which are radially interleaved with one another uniformly across the complete radial build of the pancake coils, to maintain the same voltage difference between the turns established by the electrical shifting of the first and second parallel paths in said first and second predetermined pancake coils.

References Cited

UNITED STATES PATENTS 3,278,879  10/1966  Stein _____ 336—70X

FOREIGN PATENTS 909,516  10/1962  Great Britain _____ 336—186

THOMAS J. KOZMA, Primary Examiner

U.S. Cl. X.R.

336—187